Figure 1:
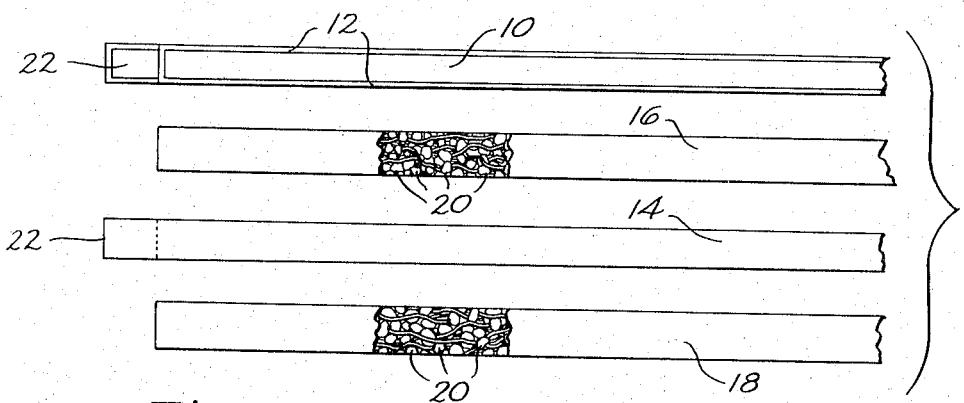

March 28, 1967     M. B. SIDDALL     3,311,797
ELECTROLYTIC CAPACITOR INCLUDING HEAT RESISTANT SPACER
CONTAINING THE ELECTROLYTE AND METHOD OF MAKING SAME
Filed Oct. 24, 1963

Mark B. Siddall
INVENTOR.

BY *Oliver D. Olson*

Agent

United States Patent Office 3,311,797
Patented Mar. 28, 1967

3,311,797
ELECTROLYTIC CAPACITOR INCLUDING HEAT RESISTANT SPACER CONTAINING THE ELECTROLYTE AND METHOD OF MAKING SAME
Mark B. Siddall, Albany, Oreg., assignor to Wah Chang Corporation, New York, N.Y., a corporation of New York
Filed Oct. 24, 1963, Ser. No. 318,658
6 Claims. (Cl. 317—230)

This invention relates to electrolytic capacitors, and more particularly to a novel solid electrolyte for electrolytic capacitors of the plate or rolled foil types.

The use of solid electrolytes affords many advantages over the liquid electrolytes conventionally employed in electrolytic capacitors. Among these advantages are longer shelf life, greater temperature range of usage, avoidance of sealing problems, and easier and less costly manufacture. A greater range of anode and cathode metals also is afforded by solid electrolytes. Some of the disadvantages attending the use of liquid electrolytes have been overcome by the development of electrolytic capacitors of the slug type. However, this latter type is more costly to produce than the plate or rolled foil types and is characterized by excessive leakage current and limited voltage ratings. Moreover, the slug type capacitor is not capable of being made of zirconium or titanium, because of the extreme hazard of fire and explosion.

It is the principal object of the present invention to provide a solid electrolyte and the method of making the same, which electrolyte is particularly suited for the making of electrolytic capacitors of the plate or rolled foil types.

Another important object of this invention is the provision of a solid electrolyte, and the method of making the same, with which the use of anodes and cathodes of zirconium, or titanium, or alloys thereof, is rendered practicable in the making of electrolytic capacitors of the plate or rolled foil types.

A further important object of the present invention is the provision of an electrolytic capacitor of the rolled foil type, and the method of making the same, which capacitor is of simplified construction for economical manufacture and which exhibits longer shelf life, greater temperature range of usage, minimum leakage current and higher voltage ratings, than electrolytic capacitors of the prior art.

A still further important object of this invention is the provision of a method of making an electrolytic capacitor of the rolled foil type, which method is economically feasible for commercial application and is operable with precision to provide electrolytic capacitors of consistent quality.

Figure 2:
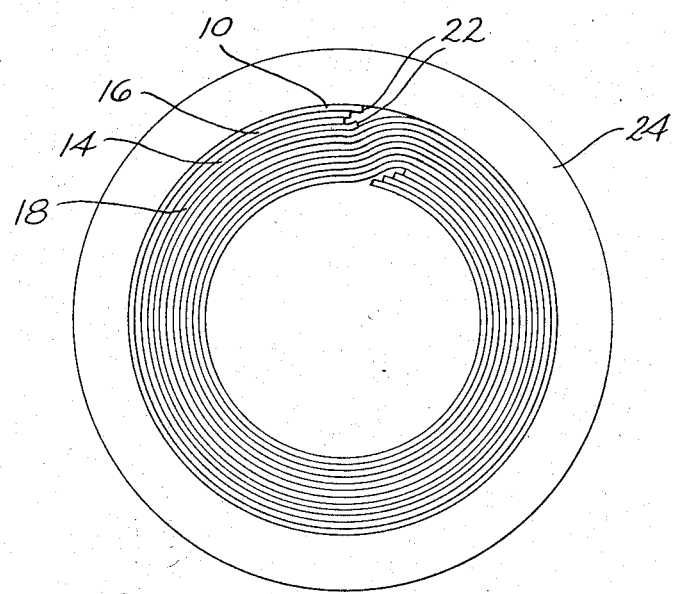

The foregoing and other objects and advantages of the present invention will appear from the following detailed description taken in connection with the accompanying drawing in which:

FIG. 1 is an enlarged exploded fragmentary view in side elevation of the components of an electrolytic capacitor embodying the features of the present invention; and FIG. 2 is a sectional view of the components of FIG. 1 assembled to form a rolled foil electrolytic capacitor embodying the features of the present invention.

In FIG. 1 of the drawing the components are shown on an enlarged scale as elongated strips which may represent plates or foils for appropriate types of capacitors. In the following discussion these strips are considered to be foils, merely for purpose of description.

The anode of the capacitor is made from a strip of foil 10 of any suitable metal, preferably of zirconium, titanium, columbium, or tantalum, or alloys thereof. A typical foil is .0005 inch thick, one inch wide and ten inches long, although other dimensions may be employed, as desired. The foil first is cleaned, if necessary, by boiling in soapy water and rinsing several times in boiling distilled water.

In the event the foil contains impurities, it is etched electrolytically by immersing it in an electrolyte and passing a current of sufficiently high density through it to burn out the impure areas. This is effected by virtue of the fact that an oxide film does not form on these impure areas and thus the high current passes selectively through them. The foil thus includes a plurality of randomly located holes.

Next, the foil is treated to form a dielectric oxide film 12 on its surface. This film forming may be achieved by anodizing, wherein the foil is immersed in an electrolyte solution and, making the foil the anode, passing a constant current through it until a predetermined voltage is reached. This condition is maintained for a time until the current drops to a low value.

The anodizing electrolyte solution may be of any well known type, such as a dilute solution of nitric acid, phosphoric acid, ammonium chloride, ammonium nitrate, ammonium acetate, ammonium formate and many others. Typical anodizing conditions involve an aqueous electrolyte solution containing 0.01 percent phosphoric acid; a constant current density of 6 milliamps per square centimeter to reach the maximum formation voltage of 200 volts, and a time of 60 minutes at said constant voltage for the current to drop to less than 5 milliamps.

Alternatively, the dielectric film may be formed by autoclaving the foil in steam at 450 to 3,000 p.s.i. and 400 to 700° F. for one to fourteen days, to provide an amorphous oxide film of desired thickness. In this regard it is important to note that oxidation in the water vapor phase, as distinguished from liquid water or gaseous oxygen, is necessary for the production of the amorphous form of the oxide.

A cathode foil 14 of similar dimensions is provided for association with the anode foil 10. If the capacitor is to be non-polar, the cathode foil is of the same metal or alloy as the anode foil and is provided with the oxide film; if the capacitor is to be polar, the cathode foil may be of a metallic material different from the anode foil.

The two foils are arranged in a lamination with two strips 16 and 18 of porous, heat resistant, non-conductive separator materials, such as woven or felted glass fiber, asbestos paper, or other suitable flexible material capable of being rolled to coil form. One of the separator strips 16 is interposed between the two foils 10 and 14, and the other separator strip is arranged to cover the exposed surface of one of the foils, preferably the cathode foil 14, as indicated in FIG. 1. Thus, when the assembly of strips is wound into a coil, as indicated in FIG. 2, the separator strip 18 is interposed between the facing surfaces of the foils. The coil is retained in shape by an external wrapping of insulating wire or other suitable material.

The foils and separator strips preferably are made as thin as practicable, where capacitor size is desired to be minimized.

The formed coil then is immersed in an aqueous or other suitable solution of a metal salt capable of being decomposed to an oxide which constitutes a conductive solid electrolyte, such as manganese dioxide, copper oxide and others. Exemplary of such materials are manganous or copper nitrate, oxalate, formate, acetate, and others. The preferred material is manganous nitrate. The porous strips of separator material thus become impregnated with the manganous salt, and this may be expedited by conducting the impregnation treatment under vacuum.

The impregnated coil then is pyrolyzed at a temperature of about 400° C., either by oven heat or by hot air blast, until no further odor of nitrogen tetroxide is detected. The vacuum impregnation and pyrolysis procedure is repeated several times, for example six times, to insure the formation of a concentration of solid manganese dioxide electrolyte 20 dispersed throughout the separator strips sufficient to provide an acceptable dissipation factor.

The impregnated coil then is vacuum impregnated with a dilute electrolyte solution and re-anodized as previously described, usually to a slightly lower voltage. The electrolyte employed in the re-anodizing step must be one that does not react with the manganese dioxide formed in the separator strips. Exemplary of suitable electrolytes is 0.1% phosphoric acid solution, 76–86% acetic acid solution, and others, such as sulphuric acid, nitric acid, lactic acid, and others.

The porous separator material may be impregnated with the metal salt solution and pyrolyzed prior to assembly with the electrode strips. However, a final impregnation and pyrolysis must be conducted after assembly in order to insure a positive electrical bond between the solid electrolyte and electrodes.

The re-anodized coil then is rinsed repeatedly in boiling distilled water, and dried in an oven. Lead wires then are connected to tabs 22 on the foils, and the entire coil finally encapsulated in a sheath 24 of paper or insulated metal tube, and the ends sealed by ceramic, glass or synthetic plastic material.

The following example is illustrative of the present invention:

A strip of zirconium foil, .0005 inch thick, one inch wide and ten inches long was cleaned, etched and anodized as described hereinbefore, and laminated with a cathode strip of zirconium of similar dimensions, separated by two strips of woven glass fiber, 0.010 inch thick, one inch wide and ten inches long. The assembly was rolled on a mandrel into a coil which was bound with insulated wire to retain its shape. The coil was vacuum impregnated with an aqueous solution containing 56% manganous nitrate and pyrolyzed at 400° C. until the fumes of nitrogen tetroxide were no longer detected. The impregnation and pyrolysis treatments were repeated six times, after which the coil was vacuum impregnated with 0.1% phosphoric acid, and re-anodized in an aqueous electrolyte solution containing 0.1% phosphoric acid, to a voltage of 120 volts. After rinsing, drying and encapsulating, the capacitor exhibited a near theoretical capacitance, a dissipation factor of 6% when measured at a frequency of 60 cycles per second, and a leakage current of 0.17 microampere per square inch when measured at 6 volts. Stable conditions of operation were maintained over the temperature range of 20° C. to 85° C.

In the manufacture of plate-type capacitors, a strip of the solid electrolyte, such as strip 16, with strip 18 omitted, is interposed between strips of anode and cathode metal, and processed in the same manner as described hereinbefore but without rolling, as will be apparent. For this purpose the porous separator material may be sintered ceramic plate, or any of the other materials mentioned hereinbefore.

From the foregoing it will be appreciated that the present invention provides a solid electrolyte well suited for the manufacture of electrolytic capacitors of the plate or rolled foil types, and affords use of anode and cathode metals not applicable with liquid electrolytes. Thus titanium may be used in the present invention since its oxide film is not soluble in the solid electrolyte. Capacitors of the present invention are produced economically, have lower leakage current, and are admirably suited for use in capacitor technology and micro-electronic circuitry constructions.

It will be apparent to those skilled in the art that various other changes may be made in the method steps, selection of materials for the method and capacitor, and other factors without departing from the spirit of this invention and the scope of the appended claims.

Having now described my invention and the manner in which it may be used, what I claim as new and desire to secure by Letters Patent is:

1. The method of making an electrolytic capacitor, comprising the sequential steps of forming a dielectric film on the surface of a strip of electrically conductive metallic anode material selected from the class consisting of zirconium, titanium, columbium, tantalum, and alloys thereof, forming a lamination of said anode strip and another strip of electrically conductive metallic cathode material with a strip of electrically non-conductive, porous, heat-resistant material interposed between the conductive strips, impregnating the non-conductive strip with a solution of a metallic salt pyrolytically convertible to a solid reducible semiconductive oxide, pyrolyzing the impregnated strip to form a solid pyrolytically reducible semiconductive oxide electrolyte overlying said dielectric film and dispersed throughout the porous strip, re-forming said dielectric film on the surface of the anode strip, and encapsulating the lamination in electrically non-conductive material.

2. The method of claim 1 including the step, before forming the dielectric film, of removing defective areas in the strip by subjecting the latter to high current density to burn out the defective areas.

3. The method of claim 1 wherein the dielectric film is formed by autoclaving in steam at a temperature and pressure and for a time sufficient to provide an oxide film of desired thickness.

4. The method of making an electrolytic capacitor, comprising the sequential steps of forming a dielectric film on the surface of a strip of electrically conductive metallic anode material selected from the class consisting of zirconium, titanium, columbium, tantalum, and alloys thereof, forming a coil of a lamination of said strip and another strip of electrically conductive metallic cathode material with two strips of electrically non-conductive, porous, heat-resistant material interposed between the conductive strips, impregnating the non-conductive strips with a solution of a metallic salt pyrolytically convertible to a solid reducible semiconductive oxide, pyrolyzing the impregnated coil to form a solid pyrolytically reducible semiconductive oxide electrolyte overlying said dielectric film and dispersed throughout the porous strip, reforming said dielectric film on the surface of the anode strip, and encapsulating the coil in electrically non-conductive material.

5. An electrolytic capacitor comprising a laminated assembly of a strip of electrically conductive metallic anode material selected from the class consisting of zirconium, titanium, columbium, tantalum, and alloys thereof having a dielectric film covering its surface, a strip of electrically conductive metallic cathode material, and a strip of electrically non-conductive, porous, heat-resistant separator material interposed between the conductive strips and a solid pyrolytically reducible semiconductive oxide electrolyte overlying said dielectric film and dispersed throughout said heat resistant material.

6. An electrolytic capacitor comprising a coil of a laminated assembly of a strip of electrically conductive metallic anode material selected from the class consisting of zirconium, titanium, columbium, tantalum, and alloys thereof having a dielectric film covering its surface, a strip of electrically conductive metallic cathode material, and a pair of strips of electrically non-conductive, porous, heat-resistant separator material interposed between the conductive strips and a solid pyrolytically reducible semi-conductive oxide electrolyte overlying said dielectric film and dispersed throughout said heat resistant material.

References Cited by the Examiner

UNITED STATES PATENTS

| | | |
|---|---|---|
| 2,005,279 | 6/1935 | Van Geel et al. _____ 317—230 |
| 2,310,932 | 2/1943 | Brennan et al. _____ 317—230 |
| 2,936,514 | 5/1960 | Millard _____ 317—230 |
| 3,066,247 | 11/1962 | Robinson _____ 317—230 |
| 3,166,693 | 1/1965 | Haring et al. _____ 317—230 |

JAMES D. KALLAM, *Primary Examiner.*